United States Patent
Upadhyay et al.

(10) Patent No.: US 9,385,974 B2
(45) Date of Patent: Jul. 5, 2016

(54) DATA MESSAGE QUEUE MANAGEMENT TO IDENTIFY MESSAGE SETS FOR DELIVERY METRIC MODIFICATION

(71) Applicant: Sprint Communications Company L.P., Overland Park, KS (US)

(72) Inventors: Umesh Chandra Upadhyay, Overland Park, KS (US); Robin Dale Katzer, Olathe, KS (US); Geoff A. Holmes, Olathe, KS (US); Robert H. Burcham, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 163 days.

(21) Appl. No.: 14/181,291

(22) Filed: Feb. 14, 2014

(65) Prior Publication Data

US 2015/0236986 A1    Aug. 20, 2015

(51) Int. Cl.
*G06F 15/16* (2006.01)
*H04L 12/58* (2006.01)

(52) U.S. Cl.
CPC ............... *H04L 51/04* (2013.01); *H04L 51/22* (2013.01); *H04L 51/36* (2013.01)

(58) Field of Classification Search
USPC ........................................................ 709/206
See application file for complete search history.

(56) References Cited

U.S. PATENT DOCUMENTS

| | | | |
|---|---|---|---|
| 5,659,599 A * | 8/1997 | Arumainayagam et al. . | 379/67.1 |
| 7,707,564 B2 * | 4/2010 | Marvin et al. ............... | 717/140 |
| 8,315,178 B2 | 11/2012 | Makhoul et al. | |
| 8,423,003 B2 | 4/2013 | Sarukkai et al. | |
| 2002/0099681 A1 | 7/2002 | Gainey et al. | |
| 2004/0120325 A1 | 6/2004 | Ayres | |
| 2005/0160098 A1 * | 7/2005 | Campbell et al. ............ | 707/10 |
| 2008/0097851 A1 | 4/2008 | Bemmel et al. | |
| 2010/0312619 A1 | 12/2010 | Ala-Pietila et al. | |
| 2012/0322468 A1 | 12/2012 | Cai et al. | |
| 2015/0067028 A1 * | 3/2015 | Kumar et al. ................ | 709/203 |
| 2015/0236986 A1 * | 8/2015 | Upadhyay et al. ........... | 709/206 |

FOREIGN PATENT DOCUMENTS

WO    2003044703    5/2003

* cited by examiner

*Primary Examiner* — Michael Y Won

(57) ABSTRACT

A communication system transfers user data messages to users. The system stores the user data messages in association with message stream identifiers and message delivery metrics. The system processes the message delivery metrics to enter the user data messages into a plurality of delivery queues associated with multiple message transmission systems. The system receives a data request indicating a message stream identifier and a message transmission system, and in response, identifies a message set and associated delivery metrics. The system receives a data instruction indicating new delivery metrics, and in response, re-enters the message set into the delivery queue. The communication system transfers the user data messages based on their associated delivery queues over data networks for receipt by the users.

20 Claims, 5 Drawing Sheets

DATA MESSAGE QUEUE MANAGEMENT TO IDENTIFY MESSAGE SETS FOR DELIVERY METRIC MODIFICATION

TECHNICAL BACKGROUND

User communication devices and data networks exchange various data messages between users. The user communication devices include computers, telephones, media players, game consoles, and the like. The data networks include wireless networks, telephony networks, Internet networks, Ethernet systems, optical systems, among others. The data message use protocols such as Electronic Mail (e-mail), Short Message Service (SMS), Multimedia Message Service (MMS), telephone calls, data push notifications, Instant Messaging (IM), and other user-to-user data transfer formats.

These user data messaging systems are often used to communicate data messages to various users in the form of message streams. For example, a school district may stream different batches of messages to parents and students using various message formats. One stream of messages may be directed to band members and parents while another message stream could be directed to senior students. In another example, an advertising company may utilize these messaging channels to implement ad campaigns for their customers. In this example, a stream of messages may be directed to users of a particular device application while another message stream could be directed to users who frequent a particular geographic area.

Communication networks have messaging platforms to ease this transfer of message streams. The messaging platforms store the data messages in queues for the various delivery systems. Unfortunately, the capability of these message platforms to search and modify their message queues is not efficient and effective.

TECHNICAL OVERVIEW

A communication system transfers user data messages to users. The system stores the user data messages in association with message stream identifiers and message delivery metrics. The system processes the message delivery metrics to enter the user data messages into a plurality of delivery queues associated with multiple message transmission systems. The system receives a data request indicating a message stream identifier and a message transmission system, and in response, identifies a message set and associated delivery metrics. The system receives a data instruction indicating new delivery metrics, and in response, re-enters the message set into the delivery queue. The communication system transfers the user data messages over data networks for receipt by the users based on their associated delivery queues.

DETAILED DESCRIPTION

Figure 1:
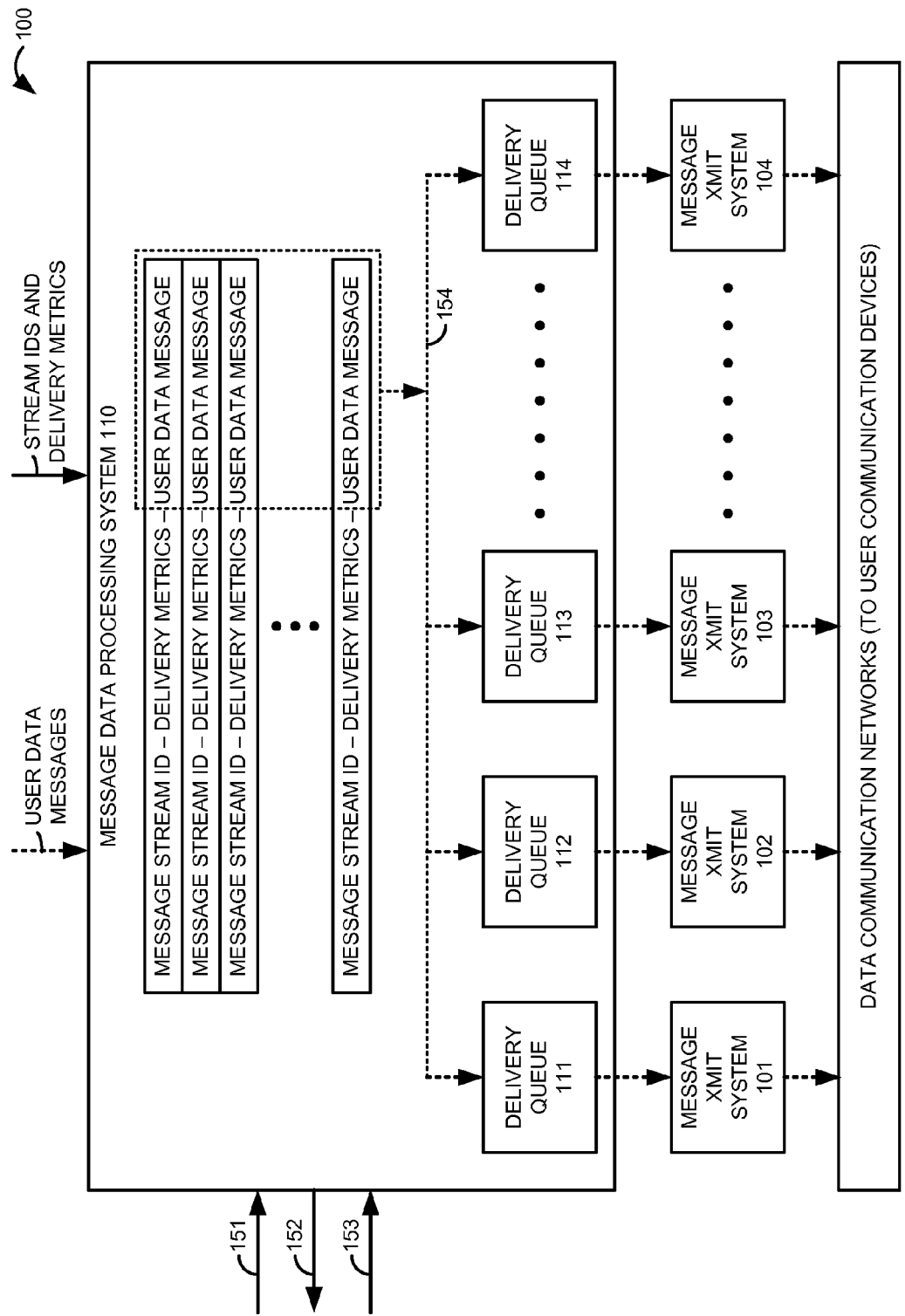
FIG. 1 illustrates a communication system to transfer user data messages to user communication devices.

FIG. 1 illustrates communication system 100 to transfer user data messages to user communication devices. Communication system 100 comprises message transmission systems 101-104 and message data processing system 110. Message data processing system 110 includes delivery queues 111-114 that are individually associated with message transmission systems 101-104. The number of queues and transmission systems may vary.

Message data processing system 110 comprises computer processing circuitry, communication circuitry, data storage equipment, and associated software/hardware components. Message data processing system 110 receives the user data messages along with associated message stream identifiers and delivery metrics. The delivery metrics indicate when and how the user data messages should be delivered. Exemplary delivery metrics indicate delivery start times, delivery finish times, message transmission systems, message delivery data, and various messaging priorities.

Message data processing system 110 stores the user data messages in association with their message stream identifiers and message delivery metrics. Delivery queues 111-114 are individually associated with message transmission systems 101-104. Message data processing system 110 processes the message delivery metrics to enter the user data messages into delivery queues 111-114 in an ordered manner. The order is the intended sequence of message transmission from their associated message transmission system. Delivery queues 111-114 transfer their user data messages in order to their associated message transmission systems 101-104.

Message transmission systems 101-104 comprise computer processing circuitry, communication circuitry, data storage equipment, and their associated software/hardware components. Message transmission systems 101-104 receive the user data messages in order from their associated delivery queues 111-114. Message transmission systems 101-104 transfer the user data messages in that order to various data communication networks for subsequent delivery to the user communication devices.

Contemporaneously with the above-described message queuing and transmission, messaging data system 110 receives data request 151 indicating a message stream identifier and a message transmission system. In some cases, the message stream identifier may also indicate the associated message transmission system. In response to request 151, message data system 110 identifies set 152 of the user data messages that are associated with the indicated message stream identifier and message transmission system. Message data system 110 also identifies the delivery metrics for set 152 of user data messages. In some cases, a human operator may view set 152 and associated delivery metrics to select new delivery metrics. In other cases, a data processing machine or module may process set 152 to select new delivery metrics responsive to various inputs.

Messaging data system 110 receives data instruction 153 indicating the message stream identifier, the message transmission system, and new message delivery metrics. In response to data instruction 153, messaging data system 110 re-enters set 152 of the user data messages in the delivery queue associated with the message transmission system. For example, system 110 may re-order delivery queue 111 for message transmission system 101 based on the new delivery metrics for a message stream directed to message transmission system 101.

Figure 2:
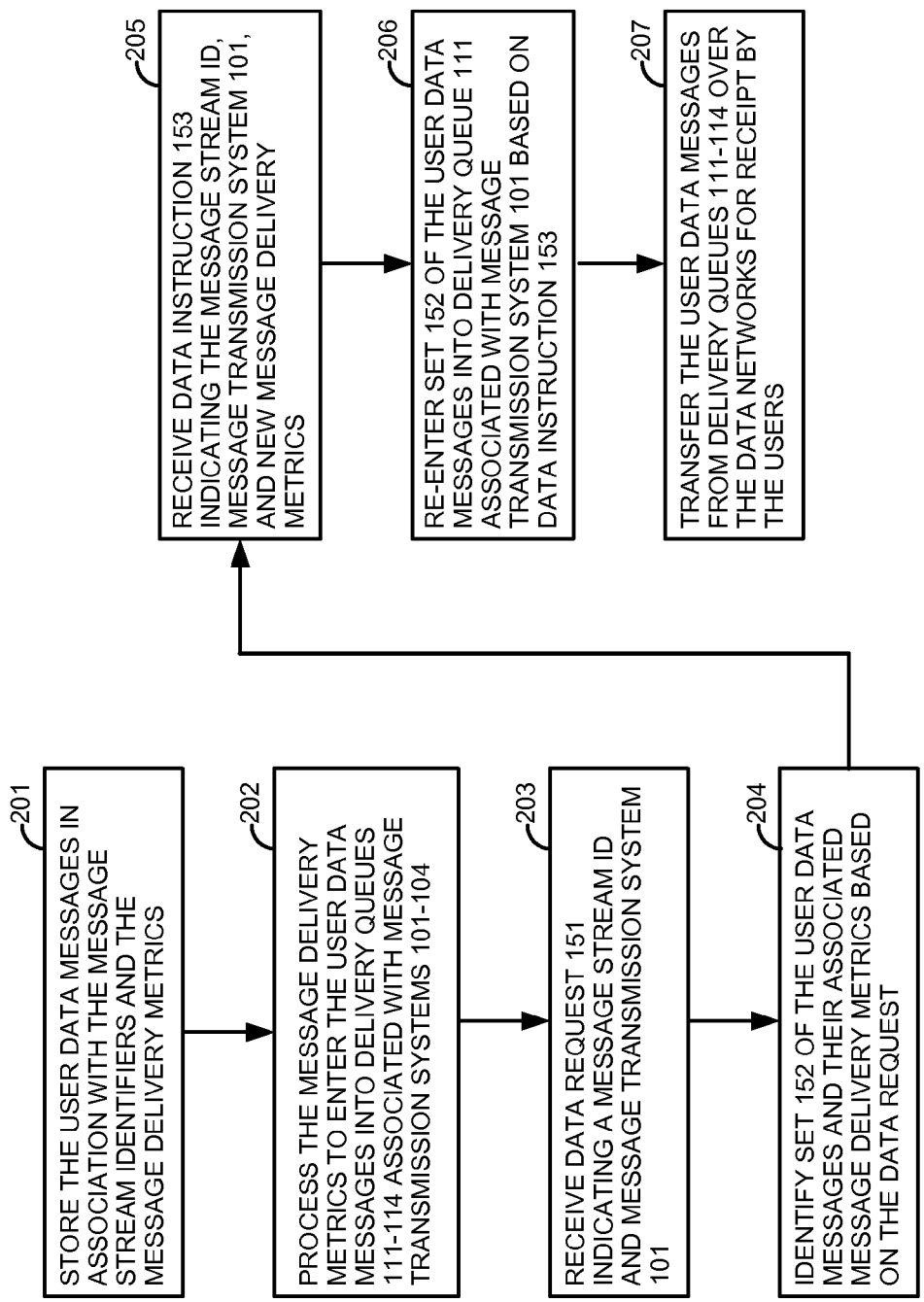
FIG. 2 illustrates the operation of the communication system to transfer the user data messages to the user communication devices.

FIG. 2 illustrates the operation of communication system 100 to transfer user data messages to user communication devices. Communication system 100 stores the user data messages in association with their message stream identifiers and message delivery metrics (201). Communication system 100 processes the message delivery metrics to enter the user data messages into delivery queues 111-114 in an ordered manner (202). The order is the intended sequence of message transmission from the associated message delivery system. Note that various data techniques for maintaining delivery queues 111-114 could be used, including various databases, protocols, pointers, keys, time stamps, and the like.

Communication system 100 receives data request 151 indicating a message stream identifier and message transmission system 101 (203). In response, communication system 100 identifies message set 152 (of user data messages) and their delivery metrics (204). Set 152 includes the user messages that are associated with both the specified message stream identifier and message transmission system 101. Subsequently, communication system 100 receives data instruction 153 indicating the message stream identifier, message transmission system 101, and new message delivery metrics (205). In response to data instruction 153, communication system 100 re-enters set 152 of the user data messages in delivery queue 111 that is associated with message transmission system 101 (206). For example, communication system 100 may re-order delivery queue 111 to change the finish date for the specified message stream directed to message transmission system 101.

In communication system 100, delivery queues 111-114 supply their user data messages in order to their associated message transmission systems 101-104, and message transmission systems 101-104 transfer the user data messages in order to various data communication networks (207). The data communication networks deliver the user data messages to the user communication devices.

Figure 3:
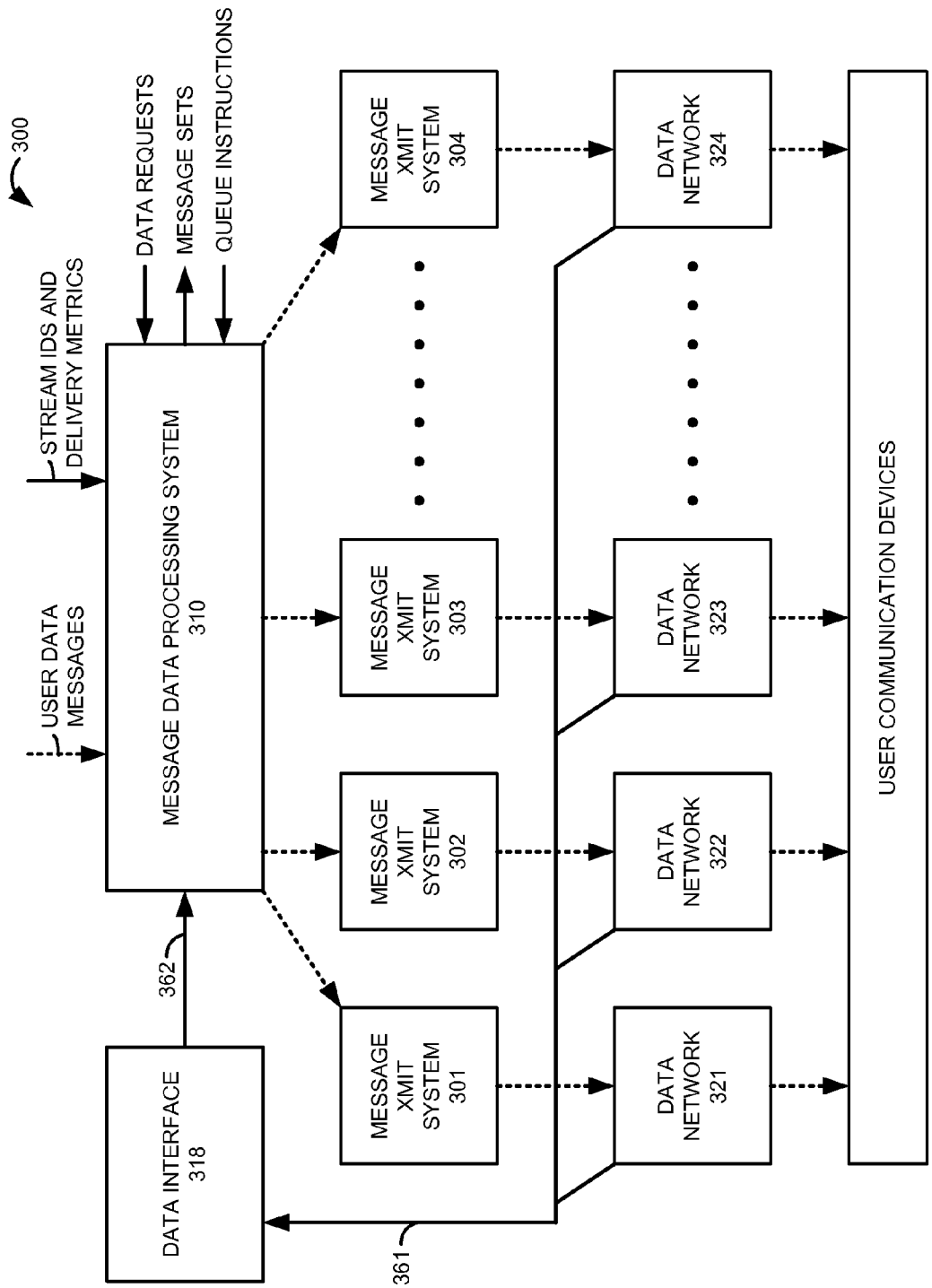
FIG. 3 illustrates a communication system to process communication usage data to transfer user data messages over data communication networks to user communication devices.

FIG. 3 illustrates communication system 300 to process communication usage data 361-362 to transfer user data messages to user communication devices over data communication networks 321-324. Communication system 300 provides an example of communication system 100, although communication system 100 may be configured and operate differently. Communication system 300 comprises message transmission systems 301-304, message data processing system 310, data interface 318, and data networks 321-324.

Data networks 321-324 comprise communication links, network elements, servers, base stations, gateways, routers and the like. Message transmission systems 301-304 comprise e-mail systems, SMS systems, MMS systems, IM systems, OS notification systems, telephony systems, and the like. User communication devices comprise computers, telephones, media players, internet appliances, and the like.

Message data processing system 310 comprises a computer and communication platform. Message data processing system 310 maintains delivery queues that are individually associated with message transmission systems 301-304 and data networks 321-324. Message data processing system 310 receives the user data messages along with associated message stream identifiers and delivery metrics. The delivery metrics indicate delivery start times, delivery finish times, message transmission systems, and various messaging priorities. Message data processing system 310 stores the user data messages in association with their message stream identifiers and message delivery metrics. Message data processing system 310 processes the message delivery metrics to enter the user data messages into the delivery queues in an ordered manner. The order is the intended sequence of message transmission from one of message transmission systems 301-304 to one of data networks 321-324. Thus, the delivery queues transfer their user data messages in order to their associated message transmission systems 301-304.

Message transmission systems 301-304 receive the user data messages in order from their associated delivery queues. Message transmission systems 301-304 transfer the user data messages in that order to data communication networks 321-324. Data networks 321-324 receive the user data messages in order from message transmission systems. Data networks 321-324 transfer the user data messages (generally in order) to the user communication devices.

Messaging data processing system 310 also processes data requests to identify sets of user data messages and delivery metrics. A human operator and/or data machine modifies some of the delivery metrics and supplies corresponding queue instructions for the message sets. Messaging data processing system 110 receives queue instructions and responsively re-enters the message sets in their respective delivery queues.

Data networks 321-324 provide various communication services to the user communication devices. Exemplary communication services include Internet access, e-mail, SMS, MMS, IM, OS notification, telephony, and the like. In some cases, the services are mobile and wireless. Data networks 321-324 generate usage data that characterizes theese provided services. Data networks 321-324 transfer some of this usage data to data interface 318. Data interface 318 comprises data storage, re-formatting, and transmission systems. Data interface 318 transfers formatted usage data 362 to message data processing system 310. The formatting reduces and translates usage data 361 into usage data 362 that uses formats and protocols compatible with message data processing system 310.

Message data processing system 310 processes communication usage data 362 to correlate the user data messages with message transmission systems 301-304 and associated data networks 321-324. The correlations may be based on a communication device's use of given data networks, including past usage frequencies and times, data transfer amounts, geographic locations, applications launched, servers accessed, financial transactions, and the like. Communication usage data 362 indicates associations of data communication networks 321-324 with the user communication devices and their associated delivery data, such as phone numbers, email addresses, domain names, resource indicators, and the like.

Figure 4:
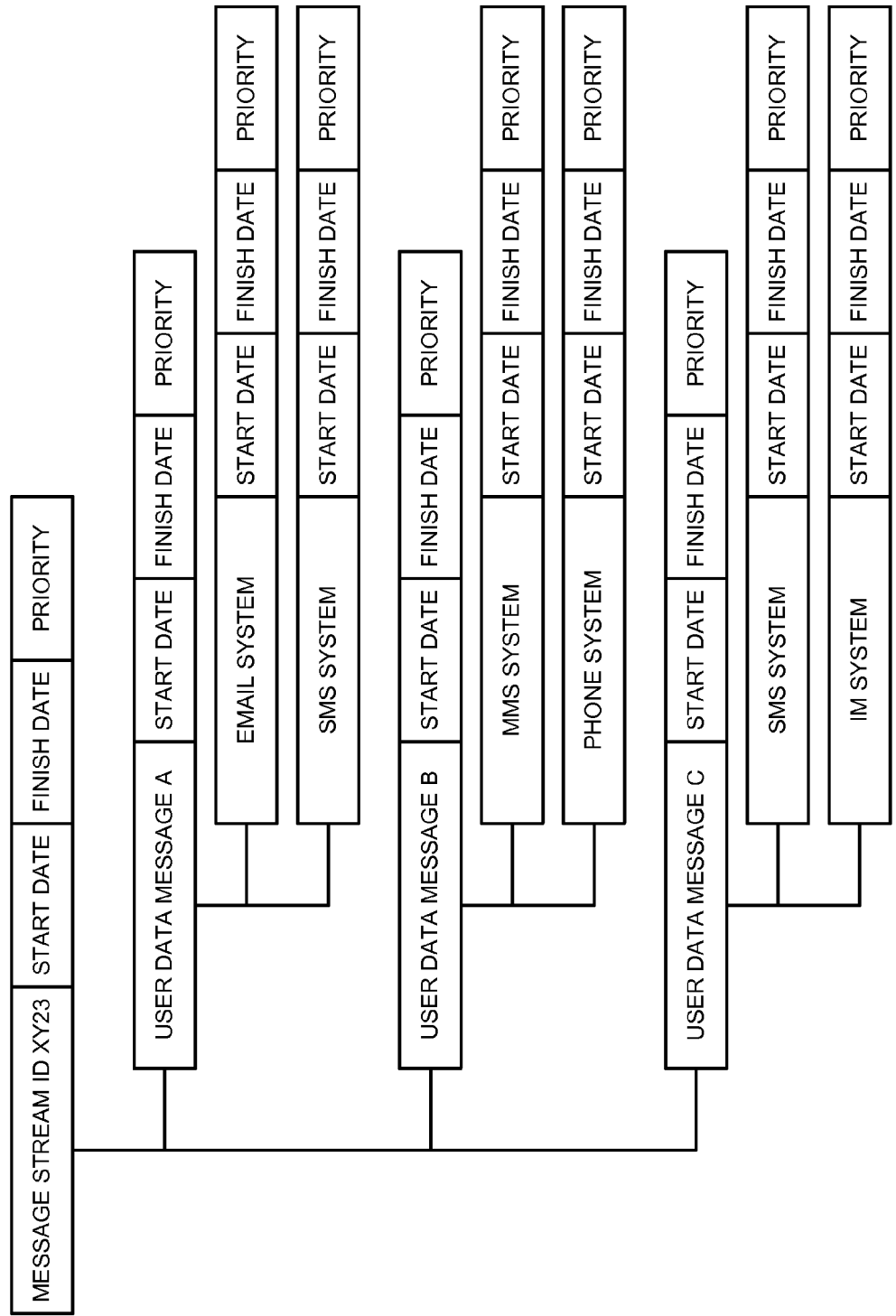
FIG. 4 illustrates a data structure to associate priorities with message streams, user data messages, and message transmission systems.

FIG. 4 illustrates a data structure 400 to associate priorities with message streams, user messages, and message transmission systems. Data structure 400 is associated with message stream ID "XY23" that has a corresponding start date, finish date, and priority relative to other message streams. Message stream XY23 is associated with user data messages A, B, and C that each have corresponding start dates, finish dates, and priorities relative to other user data messages.

User data message A is associated with two message transmission systems—an email system and an SMS system that each have a corresponding start date, finish date, and priority for the user data message. User data message B is associated with two message transmission systems—an MMS system and a telephone system that each have a corresponding start date, finish date, and priority for the user data message. User data message C is associated with two message transmission systems—the SMS system and an IM system that each have a corresponding start date, finish date, and priority for the user data message. The start date, finish date, and priority for message stream ID XY23 may set default values for the associated user messages and transmission systems, although these metrics may be separately specified or modified. The start date, finish date, and priority for a user message may set default values for the associated message transmission systems, although these metrics may be separately specified or modified as well. Note that various other delivery metrics, such as delivery frequency, delivery data, and delivery times could also be associated with the user data messages for use within the individual message transmission systems.

A message data processing system processes data structure 400 and a multitude of other like data structures to load its internal message delivery queues. The start and finish dates along with message frequency and timing information are used to enter user messages in delivery queues for various days. The priorities are then used to order the queues for a given day. The message data processing system may search these data structures to identify message sets based on these associations. All of the data items in data structure 400 could be searched using key words and queries to identify associated message sets. An exemplary search might be to identify all message stream IDs having MMS System messages with a priority greater than "3" and with a finish date of tomorrow. Another exemplary search might be to identify all user data messages for message stream ID XY23 having a start date of today. The message data processing system may receive modifications to these delivery metrics and use the modifications to adjust the message delivery queues.

Figure 5:
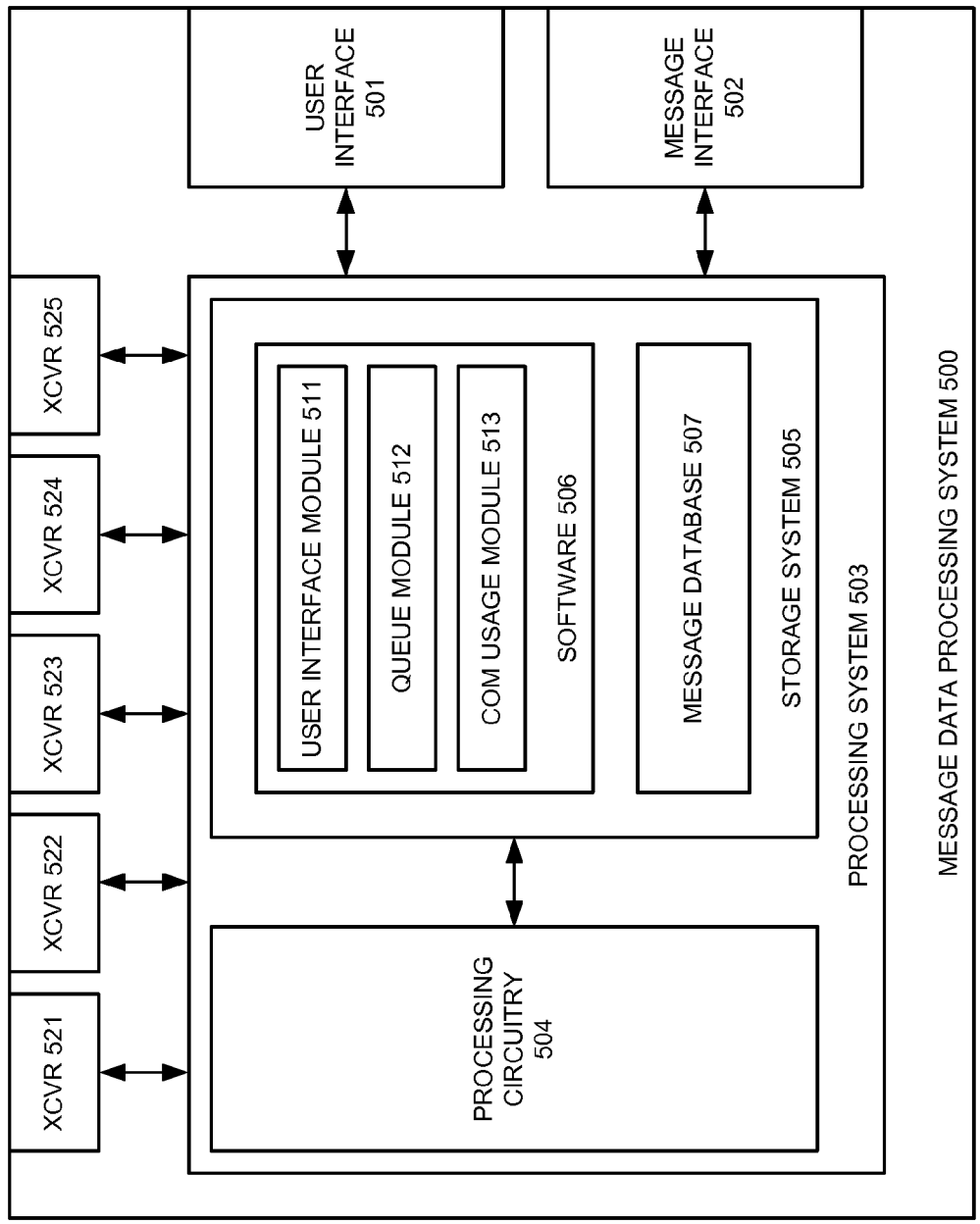
FIG. 5 illustrates a message data processing system to transfer user data messages over data communication networks to user communication devices.

FIG. 5 illustrates message data processing system 500 to transfer user data messages over data communication networks to user communication devices. Message data processing system 500 is an example of systems 110 and 310, although these systems may use alternative configurations and operations. Message data processing system 500 comprises user interface 501, message interface 502, processing system 503, and data communication transceivers 521-525. Processing system 503 comprises processing circuitry 504 and storage system 505. Storage system 505 stores software 506 and message database 507. Software 506 includes software modules 511-513. Some conventional aspects of message data processing system 500 are omitted for clarity, such as power supplies, enclosures, and the like. Message data processing system 500 may be centralized or distributed and may include various virtualized components.

User interface 501 comprises components such as keyboards, touch displays, and other components that facilitate human interaction. The human interaction may include the exchange of queries, message sets, and delivery metrics as described herein.

Message interface 502 comprises communication components, such as ports, signal processing circuitry, memory, software, and the like. Message interface 502 uses a combination of protocols, such as Ethernet, Internet, database access, and the like. Message interface 502 receives user data messages and delivery metrics as described herein. Message interface 502 may also receive data network usage data as described herein.

In processing system 503, processing circuitry 504 comprises circuit boards, integrated circuitry, and associated electronics. Storage system 505 comprises non-transitory, machine-readable, data storage media, such as flash drives, disc drives, memory circuitry, servers, and the like. Software 506 comprises machine-readable instructions that control the operation of processing circuitry 504 when executed. Software 506 includes modules 511-513 and may also include operating systems, applications, utilities, databases, and the like. All or portions of software 506 may be externally stored on one or more storage media, such as flash drives, discs, servers, and the like.

When executed by processing circuitry 504, user interface module 511 directs circuitry 504 to receive queries, identify message sets, and receive delivery metrics—typically interacting with a human operator through user interface 501. When executed by processing circuitry 504, queue module 512 directs circuitry 504 to process delivery metrics to maintain and adjust message queues. When executed by processing circuitry 504, communication usage module 513 directs circuitry 504 to correlate user data messages with user devices and message transmission systems based on communication usage data.

Communication transceivers 521-525 comprise communication components, such as ports, signal processing circuitry, memory, software, and the like. Communication transceivers 521-525 use a combination of protocols, such as Ethernet, Internet, messaging, and the like. Communication transceivers 521-525 communicate with various message transmission systems, such as email systems, SMS systems, MMS systems, telephone systems, data notification systems, and instant messaging systems. Communication transceivers 521-525 supply user data messages and delivery data in queue order to the message transmission systems for subsequent transfer to user communication devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system to transfer user data messages to users, the method comprising:
   in a messaging data system, storing the user data messages in association with message stream identifiers and message delivery metrics and processing the message delivery metrics to enter the user data messages into a plurality of delivery queues associated with a plurality of message transmission systems;
   in the messaging data system, receiving a data request indicating one of the message stream identifiers and one of the message transmission systems, and in response, identifying a set of the user data messages and their associated message delivery metrics based on the data request;
   in the messaging data system, receiving a data instruction indicating the one message stream identifier, the one message transmission system, and a new one of the message delivery metrics, and in response, re-entering the set of the user data messages into the one delivery queue associated with the one message transmission system based on the data instruction; and
   in the message transmission systems, receiving the user data messages from the messaging data system based on their associated delivery queues and transferring the user data messages over a plurality of data networks for receipt by the users.

2. The method of claim 1 wherein the new one of the message delivery metrics comprises a new message delivery start time.

3. The method of claim 1 wherein the new one of the message delivery metrics comprises a new message delivery finish time.

4. The method of claim 1 wherein the new one of the message delivery metrics comprises a new delivery priority for the at least one of the message stream identifiers.

5. The method of claim 1 wherein the new one of the message delivery metrics comprises a new delivery priority for at least one of the user messages.

6. The method of claim 1 wherein the new one of the message delivery metrics comprises a new delivery priority for at least one of the message transmission systems.

7. The method of claim 1 further comprising, in the messaging data system, processing communication usage data to correlate the user data messages with the message transmission systems.

8. The method of claim 7 wherein the communication usage data indicates the data communication networks.

9. The method of claim 7 wherein the communication usage data indicates wireless communication devices.

10. The method of claim 7 wherein the communication usage data indicates user transactions.

11. A communication system to transfer user data messages to users comprising:
a messaging data system configured to store the user data messages in association with message stream identifiers and message delivery metrics and process the message delivery metrics to enter the user data messages into a plurality of delivery queues associated with a plurality of message transmission systems;
the messaging data system configured to receive a data request indicating one of the message stream identifiers and one of the message transmission systems, and in response, identify a set of the user data messages and their associated message delivery metrics based on the data request, receive a data instruction indicating the one message stream identifier, the one message transmission system, and a new one of the message delivery metrics, and in response, re-enter the set of the user data messages in the one delivery queue associated with the one message transmission system based on the data instruction;
the message transmission systems configured to receive the user data messages from the messaging data system based on their associated delivery queues and transfer the user data messages over a plurality of data networks for receipt by the users.

12. The communication system of claim 11 wherein the new one of the message delivery metrics comprises a new message delivery start time.

13. The communication system of claim 11 wherein the new one of the message delivery metrics comprises a new message delivery finish time.

14. The communication system of claim 11 wherein the new one of the message delivery metrics comprises a new delivery priority for the at least one of the message stream identifiers.

15. The communication system of claim 11 wherein the new one of the message delivery metrics comprises a new delivery priority for at least one of the user messages.

16. The communication system of claim 11 wherein the new one of the message delivery metrics comprises a new delivery priority for at least one of the message transmission systems.

17. The communication system of claim 11 further comprising, in the messaging data system, processing communication usage data to correlate the user data messages with the message transmission systems.

18. The communication system of claim 17 wherein the communication usage data indicates the data communication networks.

19. The communication system of claim 17 wherein the communication usage data indicates wireless communication devices.

20. The communication system of claim 17 wherein the communication usage data indicates user transactions.

* * * * *